United States Patent [19]
Lawless et al.

[11] Patent Number: 5,593,771
[45] Date of Patent: *Jan. 14, 1997

[54] BARRIER LAMINATE AND METHOD USING A PORTABLE CARRIER FOR SEALING GAPS IN BUILDING CONSTRUCTION

[75] Inventors: Joseph D. Lawless, Bloomington, Minn.; Robert H. Heil, New Richmond, Wis.; Scott R. Pribnow, Woodbury; Duncan R. Russell, North Oaks, both of Minn.

[73] Assignee: Minnesota Mining and Manufacturing Company, St. Paul, Minn.

[*] Notice: The term of this patent shall not extend beyond the expiration date of Pat. No. 5,374,477.

[21] Appl. No.: 358,324

[22] Filed: Dec. 19, 1994

Related U.S. Application Data

[63] Continuation-in-part of Ser. No. 15,560, Feb. 9, 1993, Pat. No. 5,374,477.

[51] Int. Cl.[6] ...................................... B32B 9/00
[52] U.S. Cl. .................... 428/317.3; 428/58; 428/126; 428/317.5; 428/354; 428/351; 428/41.9; 156/71; 156/157; 156/324
[58] Field of Search ................... 428/354, 317.5, 428/317.3, 40, 351, 192, 126, 58; 156/157, 71, 324

[56] References Cited

U.S. PATENT DOCUMENTS

| | | | |
|---|---|---|---|
| 3,729,879 | 5/1973 | Franklin | 428/40 |
| 4,709,523 | 12/1987 | Broderick | 428/354 |
| 4,981,537 | 1/1991 | Heil et al. | 156/71 |
| 5,374,477 | 12/1994 | Lawless et al. | 428/317.3 |

FOREIGN PATENT DOCUMENTS

| | | |
|---|---|---|
| 0027750 | 8/1981 | European Pat. Off. . |
| 0399952A1 | 5/1989 | European Pat. Off. . |
| 2558505 | 7/1985 | France . |

*Primary Examiner*—Patrick Ryan
*Assistant Examiner*—Abraham Bahta
*Attorney, Agent, or Firm*—Faegre & Benson

[57] ABSTRACT

A barrier laminate for attachment to the outer surface of a structure, such as a house prior to attachment of its siding, to cover joints between structural members assembled to form the structure. The barrier laminate comprises a flexible elongate barrier layer having minute passageways between its major surfaces affording passage of water vapor while restricting the passage of liquid water and air between its major surfaces. A portable carrier having a pair of hubs engaging a roll of the barrier laminate and having a pair of trailing rollers which may be used to adhere exposed layers of pressure sensitive adhesive along each of the opposite edges of the barrier layer to structural members on opposite sides of a joint therebetween.

15 Claims, 11 Drawing Sheets

BARRIER LAMINATE AND METHOD USING A PORTABLE CARRIER FOR SEALING GAPS IN BUILDING CONSTRUCTION

CROSS-REFERENCE TO RELATED APPLICATION

This is a Continuation-In-Part of application Ser. No. 08/015,560, filed Feb. 9, 1993, now U.S. Pat. No. 5,374,477.

TECHNICAL FIELD

The present invention relates to barriers for attachment to the outer surface of a structure (e.g., over the sheathing on a house prior to attachment of its siding) over joints and gaps between sheathing members and between structural members assembled to form the structure to restrict the passage of liquid water and air (e.g., rain and wind) through the barrier to the inside, while affording passage of water vapor from the inside out to atmosphere.

BACKGROUND ART

Housewraps are known for attachment to the outer surfaces of structures (e.g., over the sheathing on a house prior to attachment of its siding) over joints between structural members assembled to form the structures, which housewraps restrict the passage of liquid water and air (e.g., rain and wind) through the housewraps into the structures, while affording passage of water vapor through the housewraps. Such restriction of liquid water keeps water (e.g., rain) from entering the structures and damaging their insulation and structural members, while such restriction of the air prevents air currents from entering the interior of the structures and minimizes air movement within the walls of the structures so that the maximum effective heat retention or "R" values of the walls can be obtained. Such passage of water vapor through the housewraps allows water vapor which enters the walls from the interior of the structures to exit so that such water vapor can be restricted from condensing within the walls and potentially damaging their insulation and structural members. Heretofore, however, such housewraps have been in the form of sheet materials attached over the entire outer surfaces of the exterior sheathing on structures such as houses prior to attaching siding to the structures. Typical sheet materials for housewraps of this type include (1) the sheet material made of spunbonded high density polyethylene fibers sold under the trade designation "DuPont Tyvek (TM) Housewrap" by DuPont Company, Wilmington, Del.; (2) the sheet material made of spunbonded polypropylene fibers sold under the trade designation "Typar (TM) Housewrap, Reemeay Inc., Old Hickory, Tenn.; (3) the high density, cross laminated microperforated polyethylene sheet material sold under the trade designation "Rufco-wrap" by Raven Industries, Inc, Sioux Falls, S.D., and (4) the crosswoven microperforated polyolefin sheet materials sold by Amoco Foam Products Company, Atlanta, Ga., and Fabrene Inc., Mississauga, Ontario, under the trade designations "Amowrap (TM) Housewrap" and "Air-Gard Housewrap, respectively. While such housewrap sheet materials are effective if properly attached to structures, such attachment is not convenient and ordinarily cannot be applied at the same time as the sheathing or siding. Such housewrap sheet materials are often installed as a separate step after the sheathing has been fully installed on a structure and before the siding is attached. Many times at least two workers are required to attach housewrap sheet material to a structure because of the large size of the housewrap sheet material. Two story structures require scaffolding to properly attach the sheet material and sometimes this is not done. Instead the sheet material is installed on the inside or outside of the second story wall section before it is stood up and hence the sheet material installed in this manner will not cover joints or gaps in the construction. Such attachment is time consuming because the housewrap sheet material is often attached to the structure by staples or other fasteners and the seams between adjacent pieces of housewrap sheet material on a structure are preferably sealed with pressure sensitive adhesive coated tape in order to effectively reduce air and water leakage at gaps and joints in the sheathing and housewrap sheet material (e.g. such as that tape sold under the trade name "8086 Builders Sealing Tape" by Minnesota Mining and Manufacturing Company, St. Paul, Minn. 55144-1000). Also, attachment of housewrap sheet material can be made difficult, complicated and possibly even dangerous by wind blowing the sheet material around. Improper attachment greatly affects performance, and extended exposure to sunlight (ultraviolet rays) can reduce performance of such housewrap sheet materials.

While it has also been known to have breathable surgical adhesive tapes which are vapor permeable (e.g. U.S. Pat. Nos. 3,121,021 and 4,112,177), such tapes have not had appropriate backing material suitable for sealing gaps in building construction and furthermore, such tapes have been coated edge-to-edge with adhesive, thus requiring a special adhesive that ultimately becomes porous to maintain vapor permeability. By being completely coated with adhesive, such tapes may attract contaminants such as dust and dirt or other particles of loose material present in a building construction environment and thus such fully coated tapes may become obstructed or clogged with foreign material, thus reducing or eliminating vapor permeability in the gap between building elements where such vapor permeability is desired.

DISCLOSURE OF INVENTION

The present invention provides a barrier for attachment to the outer surfaces of structures (e.g., over the sheathing on a house prior to attachment of its siding) over joints or gaps between structural members assembled to form the structures, which barrier will then, like the known barriers described above, restrict the passage of liquid water and air through the barriers into the structures, while affording passage of water vapor out through the barrier; but which barrier is significantly more convenient to attach in that it can be attached by one man, and its attachment is not significantly complicated by wind and can be conveniently done either at the same time the sheathing is applied or at the same time that the siding is attached over it. In addition, the adhesive used in the present invention is formulated to have good adhesion at low temperatures, enabling application of the barrier laminate over a wide range of climatic conditions.

According to the present invention there is provided a barrier laminate for attachment to the outer surface of a structure, such as over the sheathing on a house prior to attachment of its siding, to cover joints between structural members assembled to form the structure. The barrier laminate comprises (1) a flexible elongate barrier layer having minute passageways between its major surfaces affording passage of water vapor while restricting the passage of liquid water and air; and (2) means providing a layer of pressure sensitive adhesive along each of the opposite edges of the barrier layer for adhering the barrier layer to structural members on opposite sides of a joint therebetween. In the practice of the present invention, it is desirable that at least a portion of the barrier laminate between the adhesively coated edges be free of adhesive to assure vapor permeability in the barrier laminate. This will reduce a tendency of the barrier laminate to attract dust and other contaminants which may plug the minute passageways between the major surfaces, reducing or even substantially eliminating the vapor permeability of the barrier laminate.

The means providing the layer of pressure sensitive adhesive along each of the opposite edges of the barrier layer can be provided in several ways including (1) by factory coating separate layers of pressure sensitive adhesive on elongate outer portions of its first major surface adjacent each of its opposite edges with the barrier layer having a central portion at least partially free of adhesive between its outer adhesive coated portions (i.e., the central portion may be entirely free of adhesive, or the barrier layer may be coated with spaced narrow longitudinally extending layers or stripes of pressure sensitive adhesive, two of which stripes are on the elongate outer portions of its first major surface adjacent each of its opposite edges, and other of which stripes (one or more) are positioned in spaced relationship between those outer portions); (2) by a layer of pressure sensitive adhesive coated entirely over its first major surface, which layer of adhesive has through openings aligned with the minute passageways between the major surfaces of the barrier layer to afford passage of water vapor through the barrier laminate; (3) by two lengths of tape each including a backing and a layer of pressure sensitive adhesive coated on one major surface of the backing, which lengths of tape have portions of their layers of pressure sensitive adhesive adhered on the first surface of the barrier layer adjacent its opposite edges and have portions of their layers of pressure sensitive adhesive projecting past the opposite edges of the barrier layer to provide the exposed layers of pressure sensitive adhesive; or (4) by applying to the elongate outer portions of the first major surface of the barrier strip adjacent each of its opposite edges lengths of a transfer adhesive, or lengths of a double coated tape, or lengths of a tape laminate made by a device such as that described in U.S. Pat. No. 4,981,537 (the content of which is incorporated herein by reference), which tape laminate has adhesive surfaces exposed along both major sides.

A method for providing a barrier using the new barrier laminate can include applying the exposed layers of pressure sensitive adhesive along the opposite edges of the barrier layer and adhering the exposed layers of pressure sensitive adhesive on the outer surface of structural members on opposite sides of a joint therebetween with the barrier layer extending longitudinally along and bridging widthwise across the joint. This method can involve either applying the exposed layers of pressure sensitive adhesive on the barrier layer in a location remote from the structural members, such as at a factory, rolling the barrier laminate after the layers of pressure sensitive adhesive are applied, unrolling the barrier laminate from the roll at the structure, and manually adhering it to the structure. When the means in the barrier laminate that provides the exposed layer of pressure sensitive adhesive along each of the opposite edges of the barrier layer is provided by two lengths of attachment tape, this method can involve the use of a portable laminating device which adheres the lengths of tape along the opposite edges of the barrier layer, which portable laminating device can be used to form the barrier laminate at the site of the structure to which the barrier laminate is applied. Also, when the means in the barrier laminate that provides the exposed layer of pressure sensitive adhesive along each of the opposite edges of the barrier layer is provided by two lengths of transfer adhesive, or by two lengths of double coated tape, or by a tape laminate of the type described above, this method can include either (1) first applying the lengths of transfer adhesive, or the lengths of double coated tape, or the lengths of tape laminate to the barrier layer using the appropriate application device, and then applying the barrier layer carrying the pressure sensitive adhesive to the structure, or (2) first applying the lengths of transfer adhesive, or the lengths of double coated tape, or the lengths of tape laminate in spaced relationship to the structure using the appropriate application device, and then applying the barrier layer to the pressure sensitive adhesive attached to the structure.

BRIEF DESCRIPTION OF DRAWINGS

The present invention will be further described with reference to the accompanying drawing wherein like reference numerals refer to like parts in the several views, and wherein.

DETAILED DESCRIPTION

Figure 1:
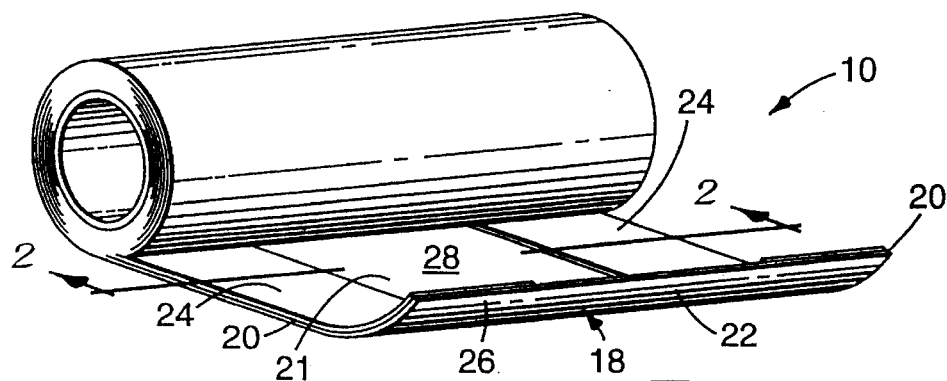
FIG. 1 is a perspective view of a first embodiment of a barrier laminate according to the present invention, illustrating a major portion of the barrier laminate disposed in a roll.
Figure 2:
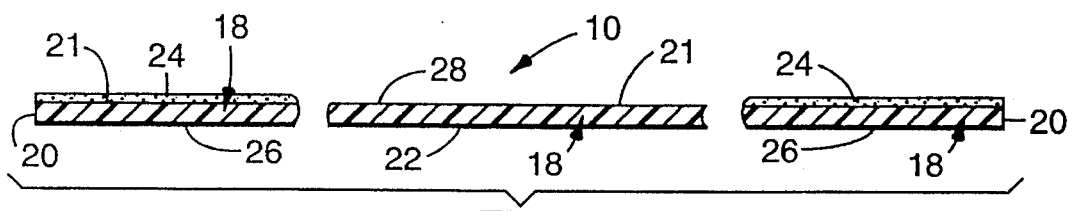
FIG. 2 is an enlarged fragmentary sectional view taken approximately along line 2—2 of FIG. 1.

Referring now to the drawing, there is shown in FIGS. 1 and 2 a first embodiment of a barrier laminate according to the present invention generally designated by the reference numeral 10. The barrier laminate 10 is adapted for attachment to the outer surface of a structure, such as a house 12 illustrated in FIG. 11 after the sheathing 11 for the house 12 is attached and prior to attachment of siding to the house 12, to cover joints 13 between structural members and between adjacent sheathing members 11, window frame 15, door frame 16, sill 17, corners, cantilevers, raised heel trusses and band joists, etc. assembled to form the structure or house 12.

As is seen in FIGS. 1 and 2, the barrier laminate 10 comprises a flexible elongate barrier layer 18 having opposite edges 20 and opposite first and second major surfaces 21 and 22. The barrier layer 18 is porous material (e.g., any one of the commercially available porous barrier sheet materials described above) so that the barrier layer 18 has minute passageways between its major surfaces 21 and 22 affording passage of water vapor between its major surfaces while restricting the passage of liquid water and air between its major surfaces 21 and 22. The barrier laminate 10 also includes means providing a layer 24 of pressure sensitive adhesive along each of the opposite edges 20 of the barrier layer 18 for adhering the barrier layer 18 to structural members on opposite sides of a joint 13. In the barrier laminate 10, that means is provided by separate layers 24 of pressure sensitive adhesive coated on elongate outer portions 26 of the first major surface 21 of the barrier layer 18 adjacent each of its opposite edges 20 with the barrier layer 18 having a central portion 28 between its outer portions 26, which central portion 28 is free of adhesive to preclude interference of the adhesive with movement of the water vapor through the barrier layer 18. Preferably the pressure sensitive adhesive used to provide the layers 24 is the same adhesive used on the tape sold under the trade name "8086 Builders Sealing Tape" by Minnesota Mining and Manufacturing Company, St. Paul, Minn. 55144-1000, which adhesive is a copolymer of isooctyl acrylate and acrylic acid as described in U.S. Pat. Nos. Re 24,906 and 2,884,126, the content whereof is incorporated herein by reference. More particularly, the adhesive formulation is preferably a copolymer of 98% (by weight) isooctyl acrylate and 2% (by weight) acrylic acid. The coating weight range is about 2 to 14 grams per square foot and preferably 4 to 8 grams per square foot. The layers 24 of pressure sensitive adhesive can be stripe coated on the barrier layer 18 using conventional factory equipment. Using such an adhesive within the parameters specified will enable application of the barrier laminate over a wide temperature range, extending down to as much as 14° F. (−10° C.).

Alternatively, the layers 24 of pressure sensitive adhesive could be provided in the form of transfer adhesive or on double coated tape and adhered to the barrier layer by conventional application equipment for such transfer adhesives or double coated tapes.

Figure 3:
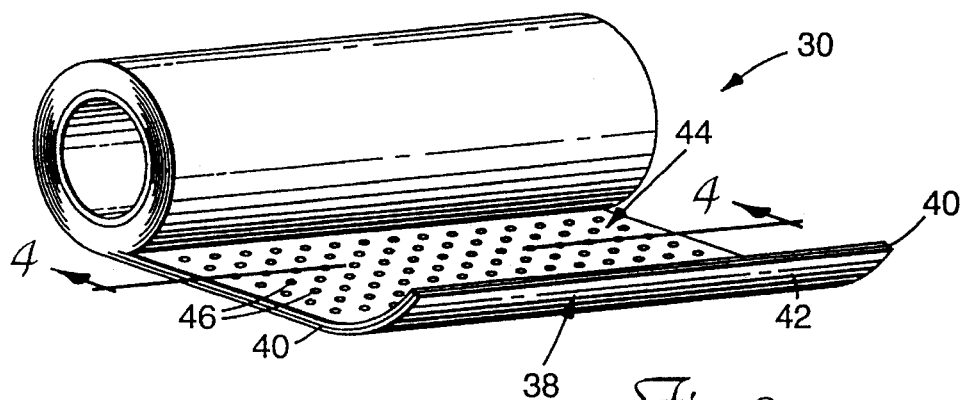
FIG. 3 is a perspective view of a second embodiment of a barrier laminate according to the present invention, illustrating a major portion of the barrier laminate disposed in a roll.
Figure 4:
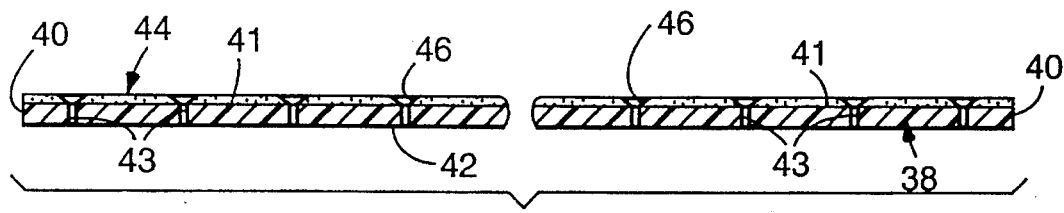
FIG. 4 is an enlarged fragmentary sectional view taken approximately along line 4—4 of FIG. 3.
Figure 7:
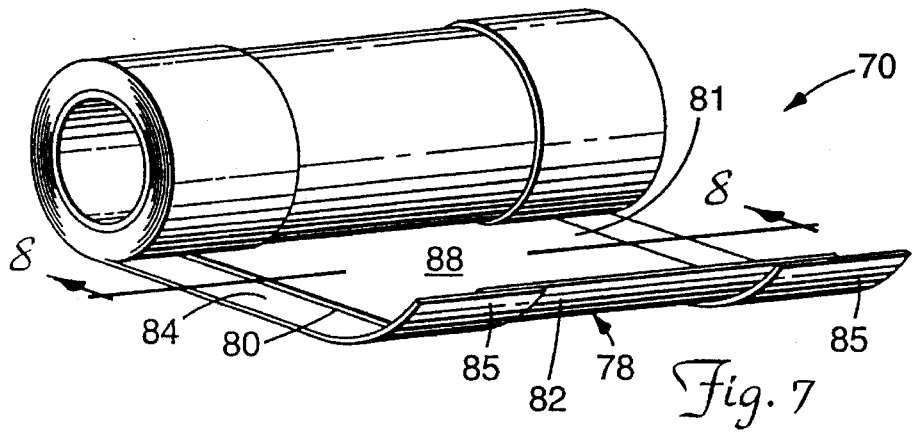
FIG. 7 is a perspective view of a forth embodiment of a barrier laminate according to the present invention, illustrating a major portion of the barrier laminate disposed in a roll.

Referring now FIGS. 3 and 4 of the drawing; there is shown a second embodiment of a barrier laminate according to the present invention generally designated by the reference numeral 30, which barrier laminate 30 is also adapted for attachment to the outer surface of a structure, such as the house 12 illustrated in FIG. 7 after its sheathing 11 is attached and prior to attachment of its siding, to cover joints 13 between structural members assembled to form the structure or house 12.

As is seen in FIGS. 3 and 4, the barrier laminate 30 comprises a flexible elongate barrier layer 38 having opposite edges 40 and opposite first and second major surfaces 41 and 42. The barrier layer 38 is porous material such as the microperforated high density polyethylene barrier sheet material sold under the trade designation "Rufco-wrap" by Raven Industries, Inc, Sioux Falls, S.D., so that the barrier layer 38 has minute passageways 43 between its major surfaces 41 and 42 affording passage of water vapor between its major surfaces while restricting the passage of liquid water and air between its major surfaces 41 and 42. The barrier laminate 30 also includes means providing an exposed layer 44 of pressure sensitive adhesive along each of the opposite edges 40 of the barrier layer 38 for adhering the barrier layer 38 to structural members on opposite sides of joint 13 therebetween. In the barrier laminate 30, that means is provided by a continuous layer 44 of pressure sensitive adhesive coated entirely over the first major surface 41 of the barrier layer 38, which layer 44 of adhesive has through openings 46 aligned with the minute passageways 43 between the major surfaces 41 and 42 of the barrier layer 38 to afford passage of water vapor through the barrier laminate 30. Such openings 46 in the layer 44 of adhesive have been found to form around the openings to the minute passageways 43 along the first major surface 41 when the material for the barrier layer described above is coated with pressure sensitive adhesive formed by the copolymerization of isooctyl acrylate and acrylic acid which is coated on the barrier layer 38 by a wire wound coating rod or by other conventional coating methods.

Figure 5:
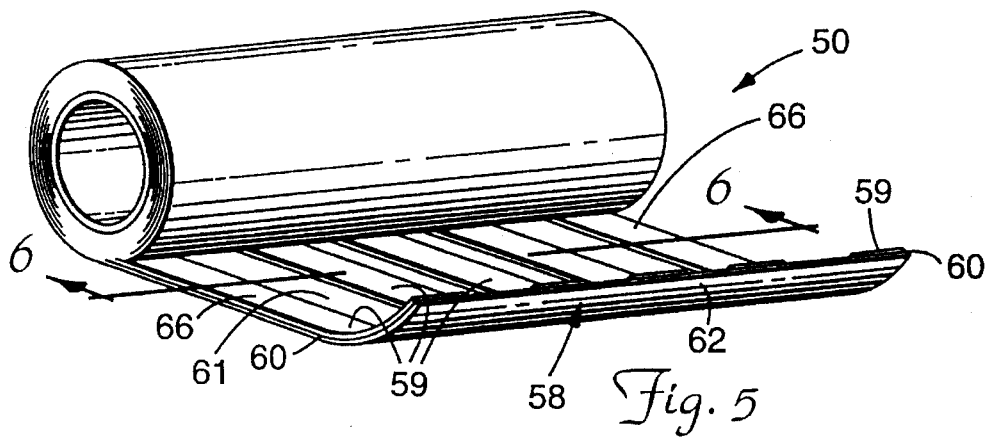
FIG. 5 is a perspective view of a third embodiment of a barrier laminate according to the present invention, illustrating a major portion of the barrier laminate disposed in a roll.
Figure 6:
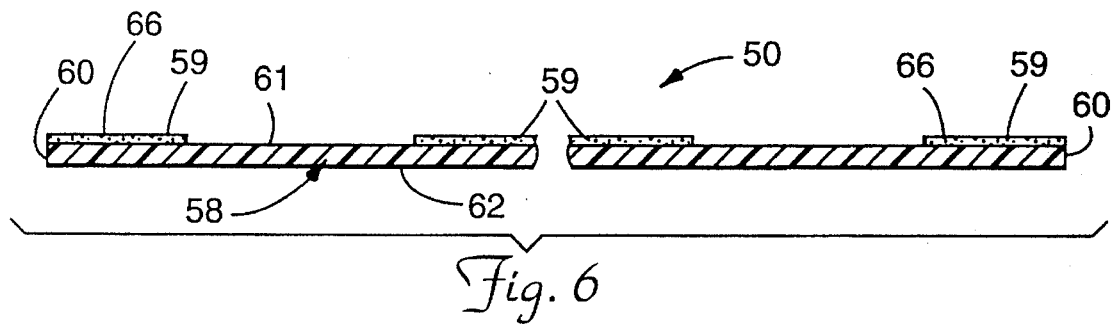
FIG. 6 is an enlarged fragmentary sectional view taken approximately along line 6—6 of FIG. 5.

Referring now to FIGS. 5 and 6 there is shown a third embodiment of a barrier laminate according to the present invention generally designated by the reference numeral 50. The barrier laminate 50 is adapted for attachment to the outer surface of a structure, such as a house 12 illustrated in FIG. 11 after the sheathing 11 for the house 12 is attached and prior to attachment of siding to the house 12, to cover joints 13 between structural members (e.g., sheathing 11, window frame 15, door frame 16, sill 17, etc.) assembled to form the structure or house 12.

As is seen in FIGS. 5 and 6, the barrier laminate 50 comprises a flexible elongate barrier layer 58 having opposite edges 60 and opposite first and second major surfaces 61 and 62. The barrier layer 58 is porous material (e.g., any one of the commercially available barrier sheet materials described above) 50 that the barrier layer 58 has minute passageways between its major surfaces 61 and 62 affording passage of water vapor between its major surfaces while restricting the passage of liquid water and air between its major surfaces 61 and 62. The barrier laminate 50 also includes means providing a layer of pressure sensitive adhesive along each of the opposite edges 60 of the barrier layer 58 for adhering the barrier layer 58 to structural members on opposite sides of a joint 13. The barrier layer 58 is coated with spaced longitudinally extending layers or stripes 59 of pressure sensitive adhesive, two of which stripes 59 are on elongate outer portions 66 of the first major surface 61 of the barrier layer 58 adjacent each of its opposite edges 60 and provide that means in the form of separate layers of pressure sensitive adhesive coated on elongate outer portions 66 of the first major surface 61 of the barrier layer 58 adjacent each of its opposite edges 60. The others of the stripes 59 (one or more, with three being illustrated) are positioned in spaced relationship between those outer portions 66. Such coating with pressure sensitive adhesive, which can be stripe coated on the barrier layer 58 using conventional factory equipment, provides the advantage that a large number of closely spaced stripes can be applied to a large sheet of the barrier layer material, and the barrier laminate may be slit in any desired width from that large sheet along lines parallel to the stripes without great concern for registry of the slitting knives with the edges of the strips of adhesive, as two of the strips will always be relatively close to the edges 60 of the barrier laminate, and the central portion of the barrier laminate will always have portions free of adhesive so as not to restrict passage of water vapor through the barrier layer 58. Preferably the pressure sensitive adhesive used to provide the layers is the same adhesive used on the tape sold under the trade name "8086 Builders Sealing Tape" by Minnesota Mining and Manufacturing Company, St. Paul, Minn. 55144-1000, which is a copolymer of isooctyl acrylate and acrylic acid as described in U.S. Pat. No. U.S. Pat. Nos. Re 24,906 and 2,884,126.

Figure 8:
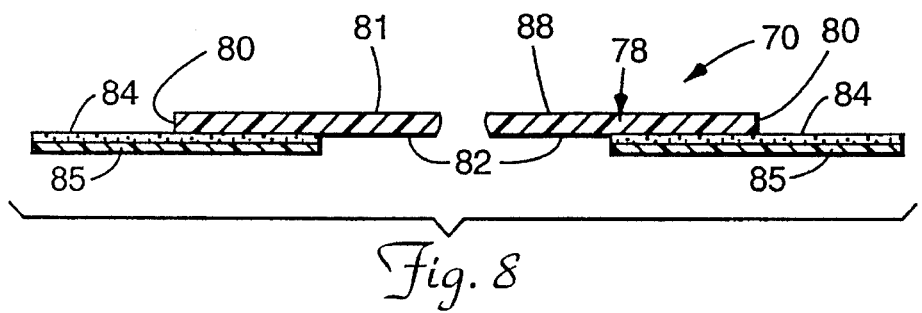
FIG. 8 is an enlarged fragmentary sectional view taken approximately along line 8—8 of FIG. 7.
Figure 11:
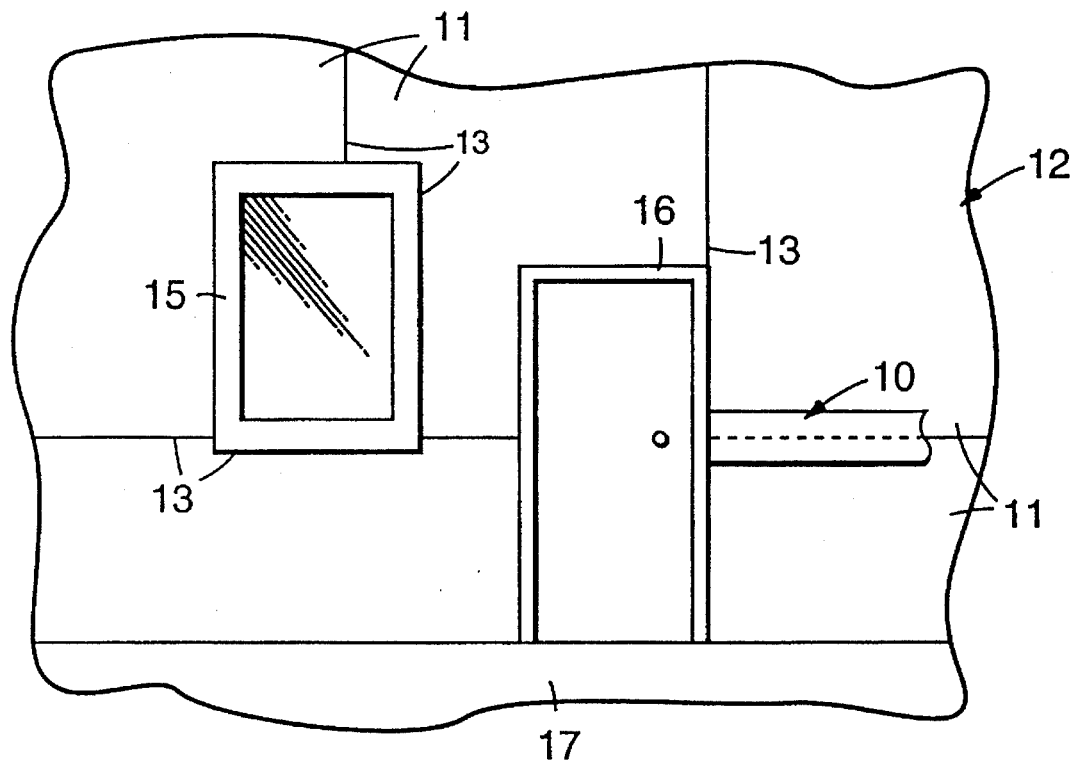
FIG. 11 is a fragmentary view of a structure having one of the barrier laminates illustrated in FIGS. 1 through 10 applied thereto.

Referring now to FIGS. 7 and 8 of the drawing, there is shown a fourth embodiment of a barrier laminate according to the present invention generally designated by the reference numeral 70, which barrier laminate 70 is adapted for attachment to the outer surface of a structure, such as a house 12 illustrated in FIG. 11 after the sheathing 11 for the house 12 is attached and prior to attachment of siding to the house 12, to cover joints 13 between structural members assembled to form the structure or house 12.

As is seen in FIGS. 7 and 8, the barrier laminate 70 comprises a flexible elongate barrier layer 78 having opposite edges 80 and opposite first and second major surfaces 81 and 82. The barrier layer 78 is porous material (e.g., any one of the commercially available barrier sheet materials described above) so that the barrier layer 78 has minute passageways between its major surfaces 81 and 82 affording passage of water vapor between its major surfaces while restricting the passage of liquid water and air between its major surfaces 81 and 82. The barrier laminate 70 also includes means providing an exposed layer 84 of pressure sensitive adhesive along each of the opposite edges 80 of the barrier layer 78 for adhering the barrier layer 78 to structural members on opposite sides of a joint 13 therebetween. In the barrier laminate 70, that means is provided by two lengths 85 of tape each including a backing and a layer of pressure sensitive adhesive coated on one major surface of the backing (e.g., such as the pressure sensitive adhesive coated tape used is the tape sold under the trade name "8086 Builders Sealing Tape" by Minnesota Mining and Manufacturing Company, St. Paul, Minn. 75144-1000). Portions of the layers of pressure sensitive adhesive on the lengths 85 of tape are adhered on the second surface 82 of the barrier layer 78 adjacent its opposite edges 80 with portions of the layers of pressure sensitive adhesive on the lengths 85 of tape projecting past the opposite edges 80 of the barrier layer 78 to provide the exposed layers 84 of pressure sensitive adhesive by which the barrier laminate 70 can be adhered to a substrate, with the barrier layer 78 having a central portion 88 between the lengths 85 of tape, which central portion is free of adhesive and tape to preclude interference by the adhesive or tape with movement of the water vapor through the barrier layer 78.

Figure 12:
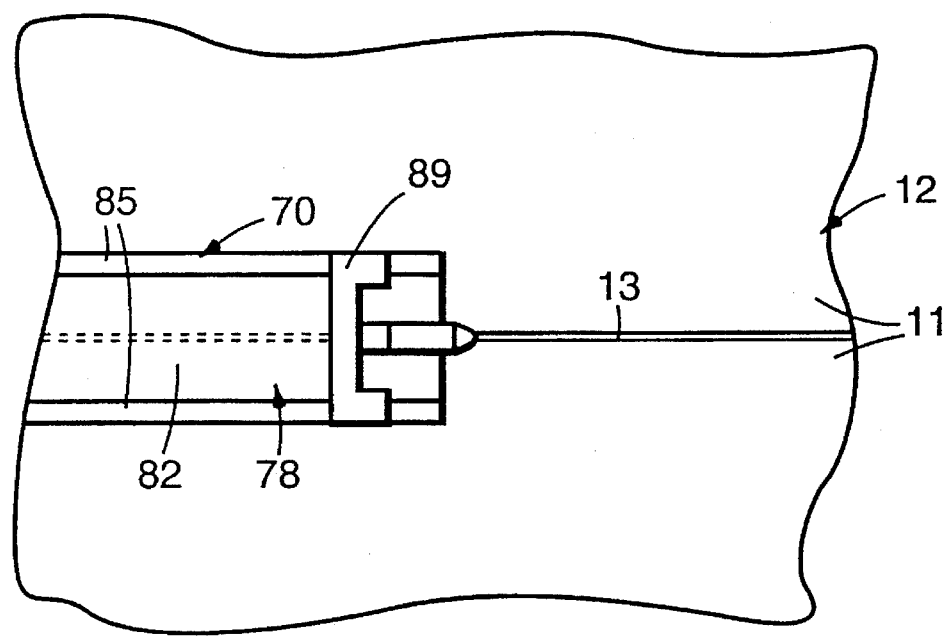
FIG. 12 is a fragmentary view of a structure having the barrier laminate of FIGS. 5 and 6 formed by a laminating device and applied thereto.

While the barrier laminate 70, like the barrier laminates 10 and 30, can be formed by factory equipment, rolled, shipped to the job cite, and applied from the roll as is illustrated in FIG. 11, the thickness of the laminate 70 where the lengths 85 of tapes and the barrier layer are adhered together causes thick portions of the roll which interfere with complete adhesion together of the portions of the lengths 85 of tape that project past the edges 80. Thus, preferably the barrier laminate 70 is formed at the site of the structure to which it is to be applied using a portable laminating device 89 such as that illustrated in FIG. 12, which laminating device 89 adheres the lengths 85 of tape to the barrier layer 78 to form the barrier laminate 70, after which the barrier laminate 70 is adhered over the joint 13. The laminating device 89 is somewhat similar to the laminating devices described in U.S. Pat. Nos. 4,379,019 (Pool) and 5,037,501 (Lawson) but is improved by the addition of a better cut off blade of the type described in U.S. Pat. No. 4,913,767 (Longworth), a guard for the cut off blade of the type described in U.S. Pat. No. 4,989,769 (Longworth et al), and a better tape guide system of the type described in U.S. Pat. No. 4,990,214 (Heil et al), the content of which U.S. Pat. Nos. 4,379,019, 5,037,501, 4,913,767, 4,989,769 and 4,990,214 are hereby incorporated herein by reference.

Figure 9:
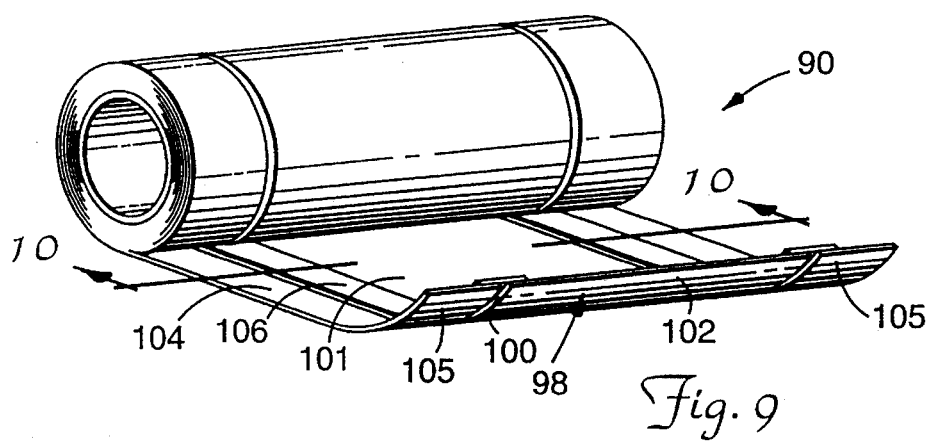
FIG. 9 is a perspective view of a fifth embodiment of a barrier laminate according to the present invention, illustrating a major portion of the barrier laminate disposed in a roll.
Figure 10:
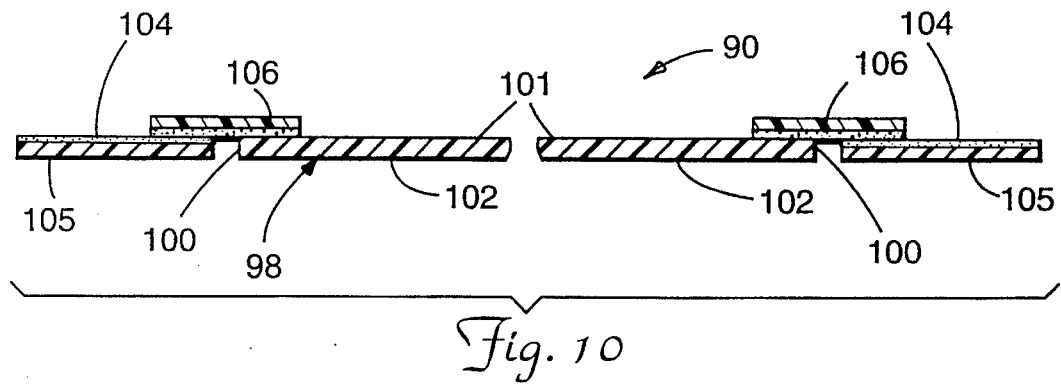
FIG. 10 is an enlarged sectional view taken approximately along line 10—10 of FIG. 9.

Referring now to FIGS. 9 and 10 of the drawing, there is shown a fifth embodiment of a barrier laminate according to the present invention generally designated by the reference numeral 90, which barrier laminate 90 is adapted for attachment to the outer surface of a structure, such as a house 12 illustrated in FIG. 11 after the sheathing 11 for the house 12 is attached and prior to attachment of siding to the house 12, to cover joints 13 between structural members assembled to form the structure or house 12.

As is seen in FIGS. 9 and 10, the barrier laminate 90 comprises a flexible elongate barrier layer 98 having opposite edges 100 and opposite first and second major surfaces 101 and 102. The barrier layer 98 is porous material (e.g., any one of the commercially available barrier sheet materials described above) so that the barrier layer 98 has minute passageways between its major surfaces 101 and 102 affording passage of water vapor between its major surfaces 101 and 102 while restricting the passage of liquid water and air between its major surfaces 101 and 102. The barrier laminate 90 also includes means providing an exposed layer 104 of pressure sensitive adhesive along each of the opposite edges 100 of the barrier layer 98 for adhering the barrier layer 98 to structural members on opposite sides of a joint 13 therebetween. In the barrier laminate 90, that means is provided by two first lengths 105 of tape each including a backing and a layer of pressure sensitive adhesive coated on one major surface of the backing (e.g., such as the pressure sensitive adhesive coated tape used is the tape sold under the trade name "8086 Builders Sealing Tape" by Minnesota Mining and Manufacturing Company, St. Paul, Minn. 75144-1000), which first lengths 105 of tape are adhered edge to edge with the barrier layer 98 by two second lengths of pressure sensitive adhesive coated tape 106 (e.g., also the 8086 Builders Sealing Tape). The Barrier laminate 90 could be prepared on factory equipment and rolled into a roll as shown. Alternatively, portions of the layers of pressure sensitive adhesive on each of the two lengths of tape 105 and 106 along each edge 100 of the barrier layer 98 can be adhered to each other using a laminating device of the type descried in U.S. Pat. No. 4,981,537 (the content whereof is incorporated herein by reference) after which the two laminates can either be adhered along the opposite edges 100 of the barrier layer 98 as shown, or the two laminates can first be adhered to a structure along opposite sides of the joint to be covered, and the barrier layer 98 can then be adhered to the exposed layers of adhesive on the second lengths 106 of tape in those laminates.

Figure 13:
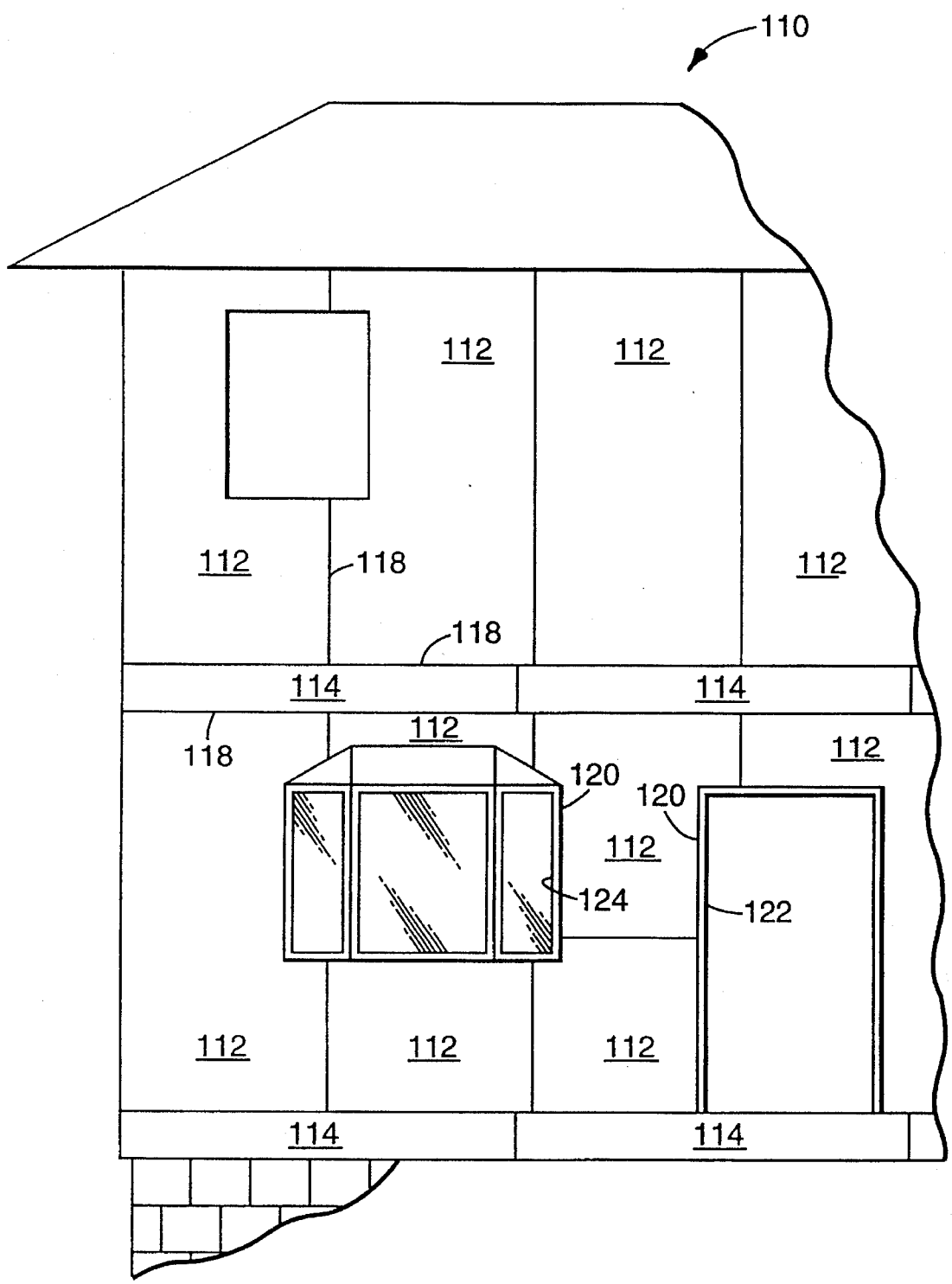
FIG. 13 is a fragmentary view of a structure after installation of sheathing but prior to application of a barrier laminate applied thereto.

Referring now to FIG. 13, a structure such as a two story house 110 preferably has sheathing members or panels 112 applied. Cut down sheathing member 114 preferably covers a band joist 116 (see FIG. 14) between stories of house 110. It is to be understood that seams 118 between sheathing members 112, 114 and gaps or joints 120 with door frames 122 and window frames 124 may also be sealed by a barrier laminate according to the practice of the present invention.

Figure 14:
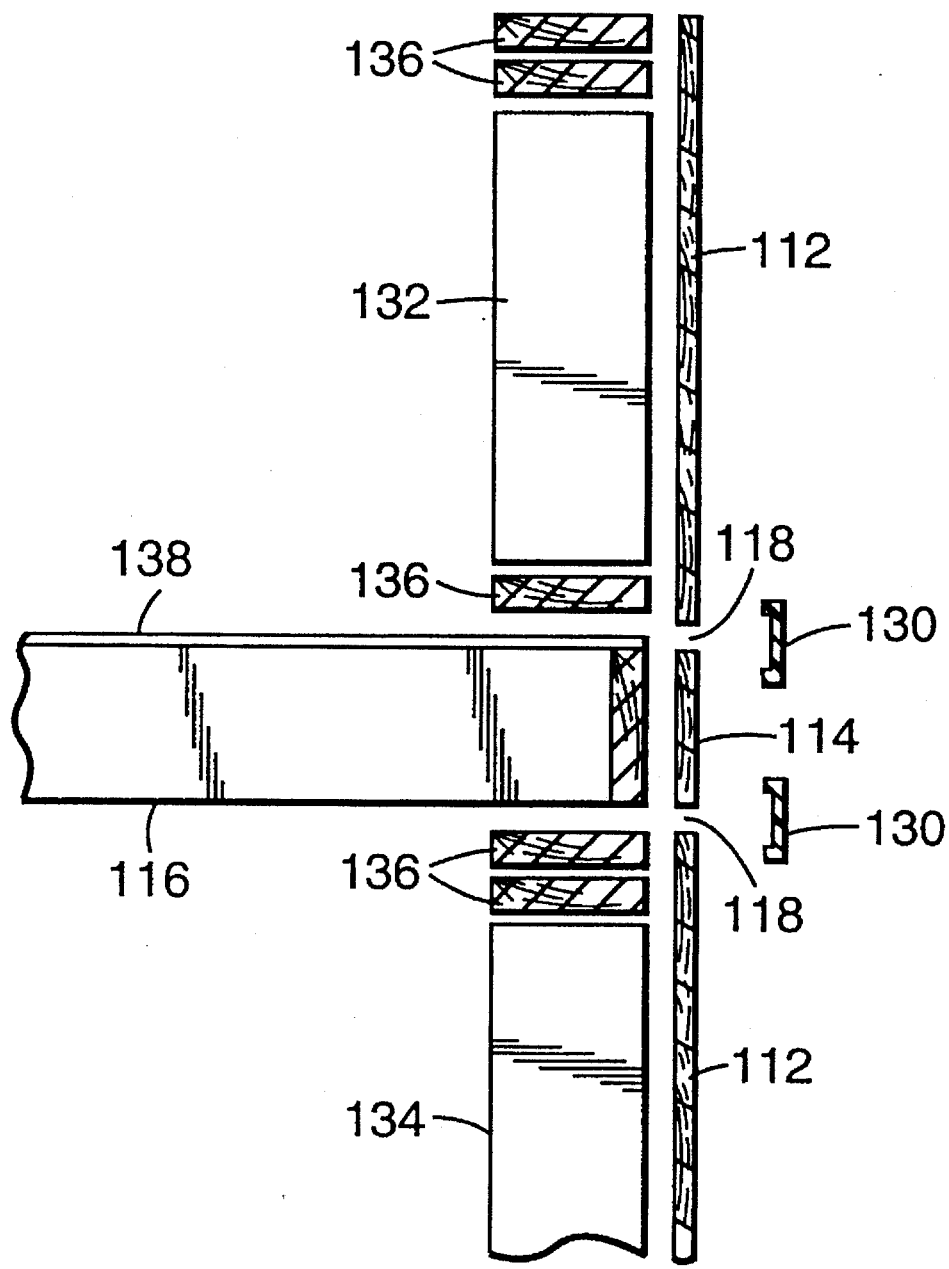
FIG. 14 is a detailed exploded view of a portion of the structure of FIG. 13 illustrating application of the barrier laminate to a band joist area of the structure.

More particularly, and referring now to FIG. 14, barrier laminate 130 in any of the embodiments of the present invention is preferably applied to seams 118 between sheathing members 112 and 114. It is to be understood that sheathing members 112 are applied to the exterior of the house frame which includes studs 132, 134 and plates 136. A subfloor 138 is preferably positioned on band joist 116 beneath adjacent plates 136.

Figure 15:
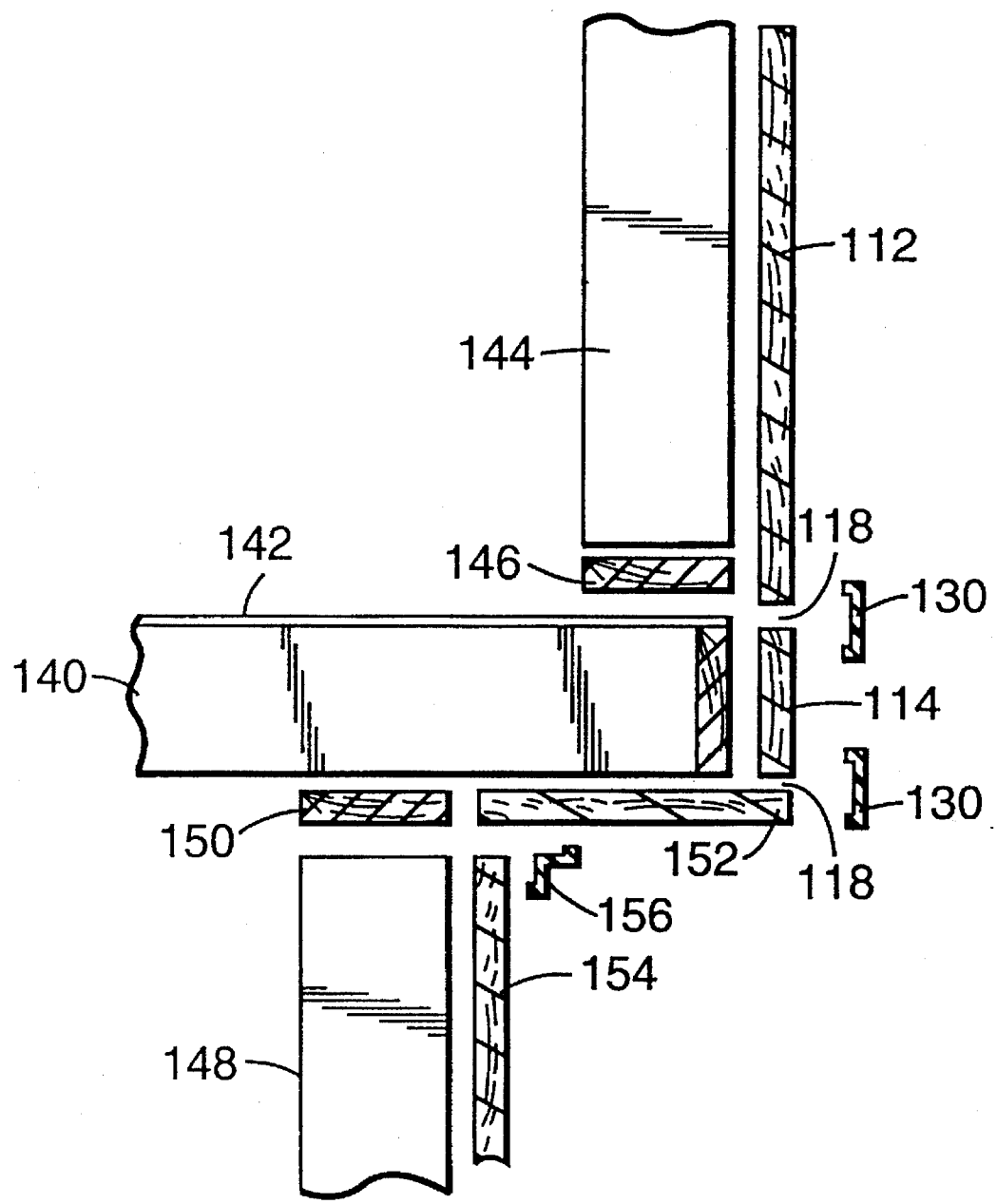
FIG. 15 is a detailed exploded view of a structure having a cantilevered wall illustrating application of the barrier laminate.

Referring now to FIG. 15, a cantilevered wall section may be seen having joist 140 carrying subfloor 142 and having an upper wall with studs 144 supported by plate 146 and a lower wall formed by studs 148 ending at plate 150. In addition to sheathing members 112, 114, it is preferable to have a subjacent sheathing member 152 to close the gap that would otherwise occur between cut down sheathing member 114 and lower wall sheathing member 154. Barrier laminate 130 is preferably applied to the gaps or joints between sheathing members 112, 114 and sheathing members 114, 152. In addition, a barrier laminate 156 may be applied to the inside corner formed by subjacent sheathing member 152 and lower wall sheathing member 154 to seal the seam or gap therebetween.

Figure 16:
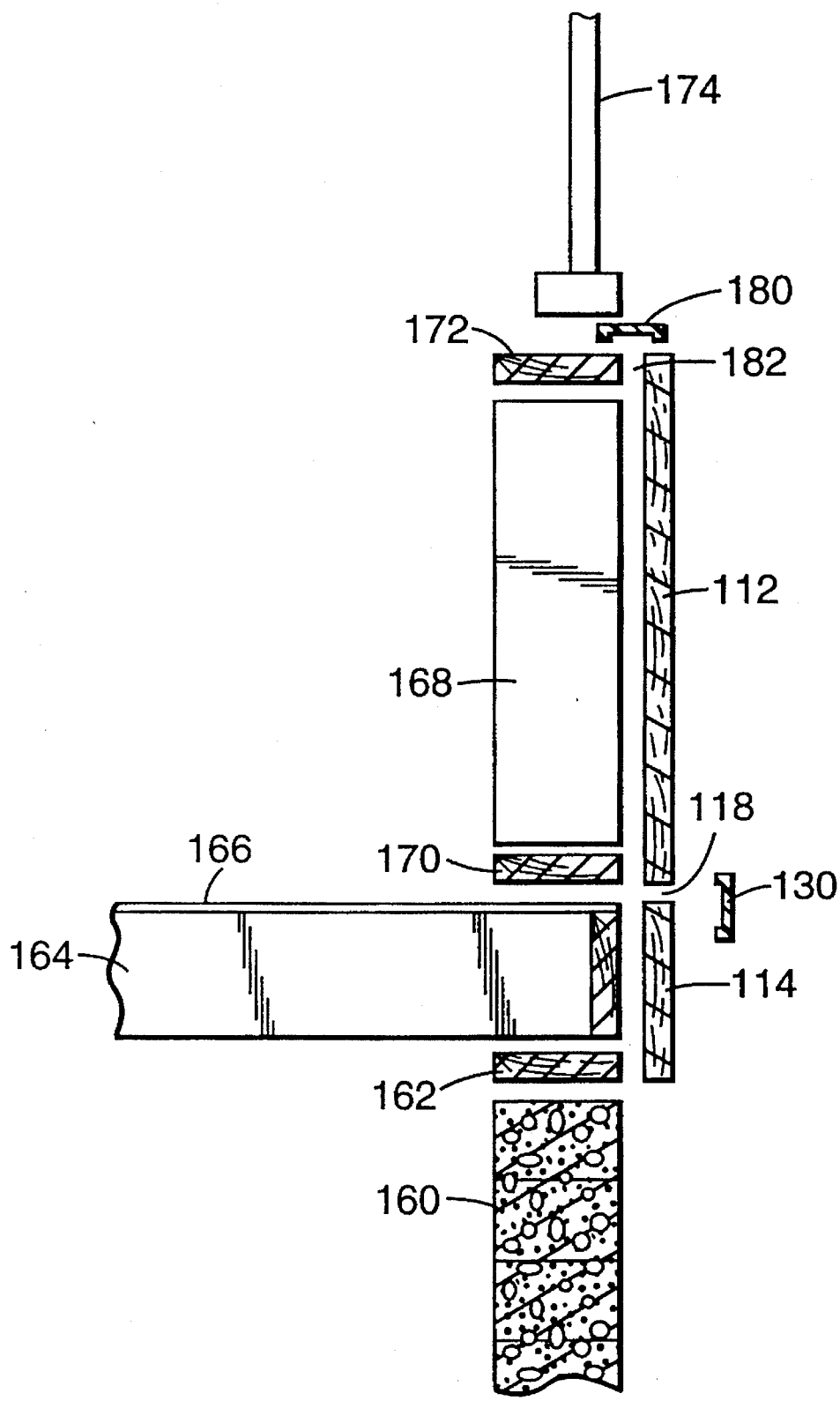
FIG. 16 is a detailed exploded view of a structure illustrating application of the barrier laminate to a standard wall framing detail.

Referring now to FIG. 16, foundation 160 preferably has a plate 162 located thereon supporting joist 164 and subfloor 166. An upper wall portion is formed by stud 168 carried by plate 170 and framing member 172. This upper wall section is sized to receive a window 174. Barrier laminate 130 is preferably used to seal the gap or seam 118 between sheathing members 112 and 114. A further barrier laminate 180 may be applied between sheathing member 112 and upper structural member 172 before window 174 is installed to seal gap 182 between member 172 and sheathing 112.

Referring now to FIGS. 17–27, further aspects of the present invention may be seen.

Figure 17:
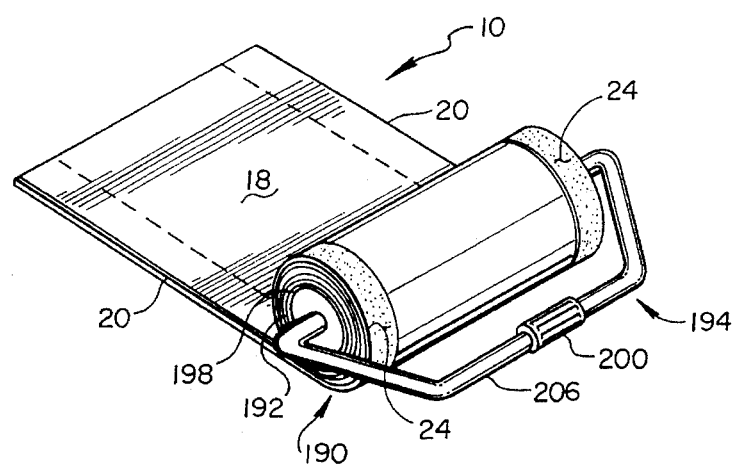
FIG. 17 is a perspective view of a roll of barrier laminate and carrier useful in transporting and applying the barrier laminate.

In FIG. 17, the barrier laminate 10 is formed as a cylinder or roll 190 carried on a core 192.

In FIGS. 17, 18, 19 and 24, roll 190 is shown in a first embodiment having pressure sensitive adhesive layers 24 located along opposite edges 20 of the barrier layer 18 with the adhesive layers 24 exposed or facing outward on roll 190.

Figure 20:
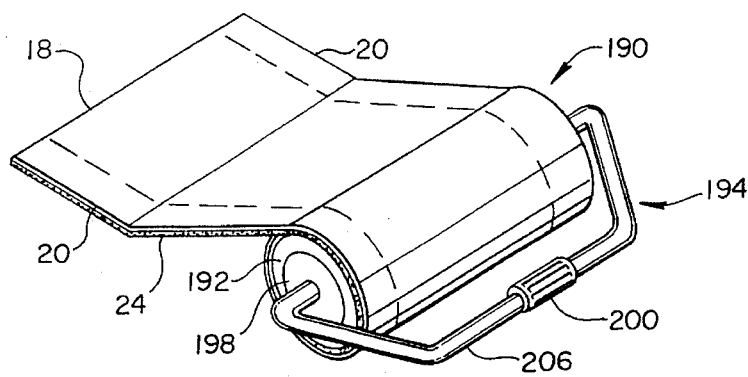
FIG. 20 is a perspective view of an alternative embodiment of the barrier laminate of the present invention along with the carrier of FIG. 17.
Figure 21:
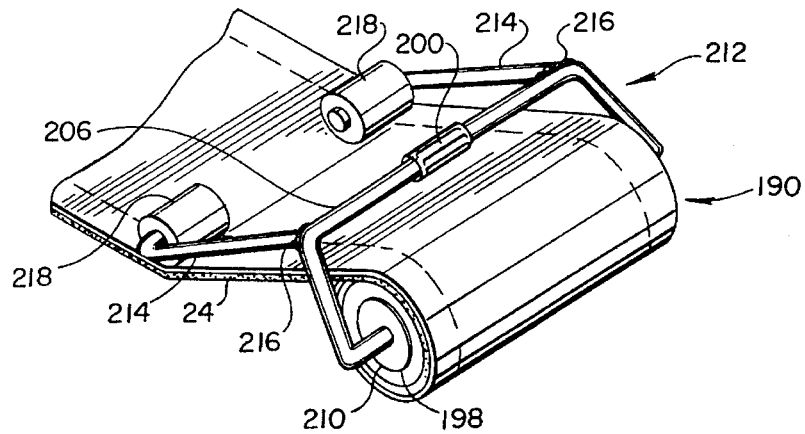
FIG. 21 is a perspective view of the embodiment of the barrier laminate shown in FIG. 20 along with the carrier shown in FIG. 18.
Figure 22:
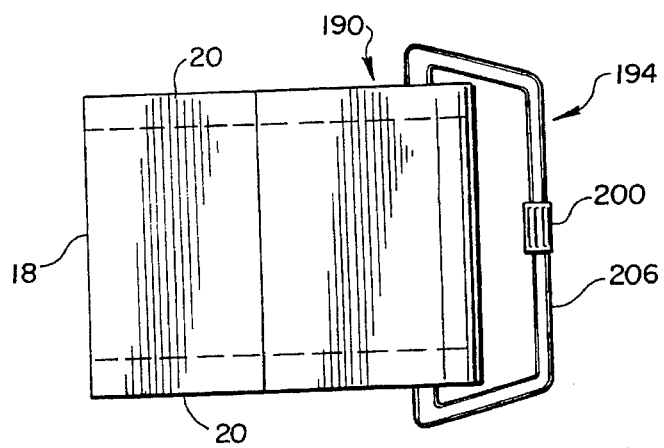
FIG. 22 is a side view similar to FIG. 19 of the barrier laminate and carrier of FIG. 20.

In an alternative embodiment, the layers 24 of pressure sensitive adhesive face radially inward on the roll 190 as shown in FIGS. 20, 21 and 22 and are thus generally concealed when the barrier laminate is rolled up.

Figure 23:
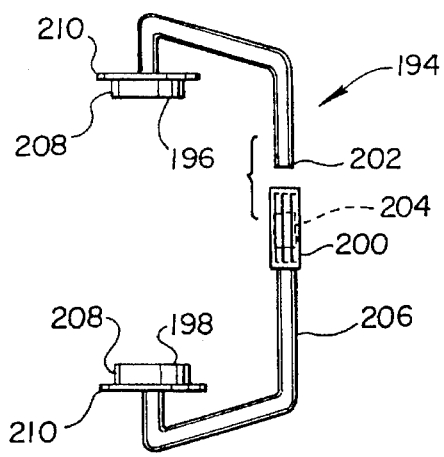
FIG. 23 is a partially exploded side view of the first embodiment of the carrier shown in FIGS. 17, 19, 20 and 22.
Figure 24:
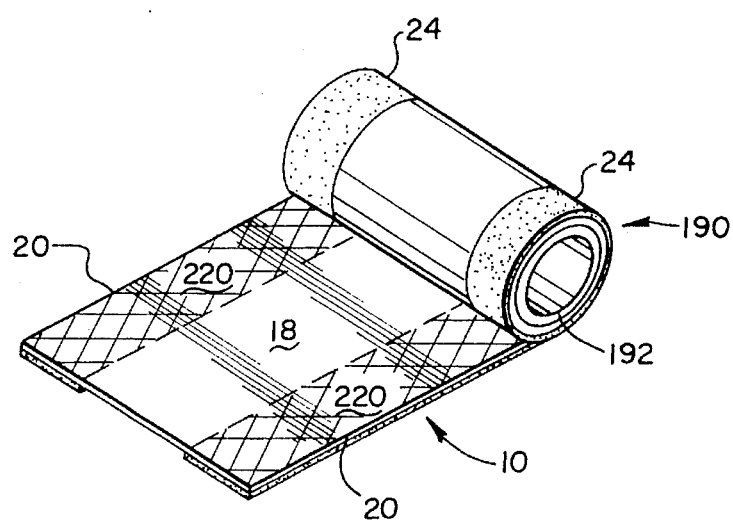
FIG. 24 is a perspective view of the barrier laminate of FIG. 17.

A portable carrier 194 may be used to transport and apply the barrier laminate 10 when it is in the form of roll 190. The carrier 194 includes a pair of hubs 196, 198 with one hub at each of first and second ends of the core 192 and the carrier 194 further includes a handle 200 exterior of the roll 190 when the hubs are engaged with the core 192. Carrier 194 also preferably includes a clutch or chuck mechanism within handle 200 to retain end 202 within handle 200, thereby retaining the axial distance between hubs 196 and 198 when the carrier 194 is assembled on the roll 190. It is to be understood that the chuck mechanism 204 has radially moveable jaws to act against and retain end 202 and that the jaws are radially moved by rotation of handle 200 with respect to bar or frame 206 of carrier 194 with the clutch released, hubs 196, 198 may be moved together or apart to accomodate different width rolls, and to attach and detach the carrier 194 from the roll 190. Referring most particularly to FIG. 23, each hub 196, 198 has a reduced diameter inner portion 208 and a radial flange 210. It is to be understood that hubs 196, 198 are attached to frame 206 for rotation relative thereto to permit the roll 190 to rotate with respect to the carrier 194.

Figure 18:
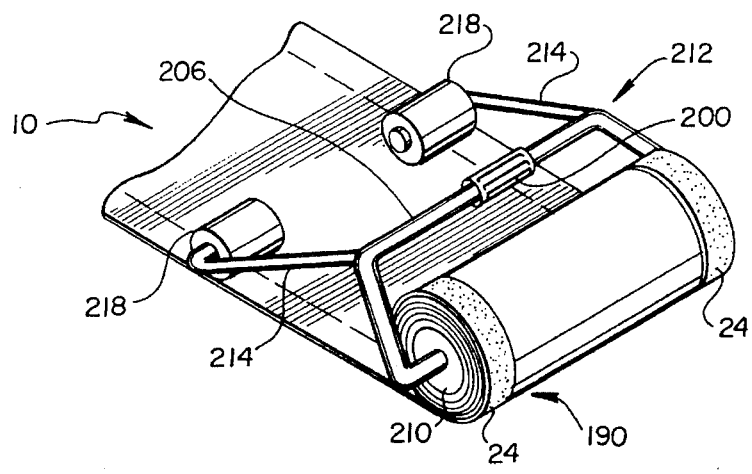
FIG. 18 is a perspective view of a roll of barrier laminate and a second embodiment of a carrier useful in transporting and applying the barrier laminate.
Figure 19:
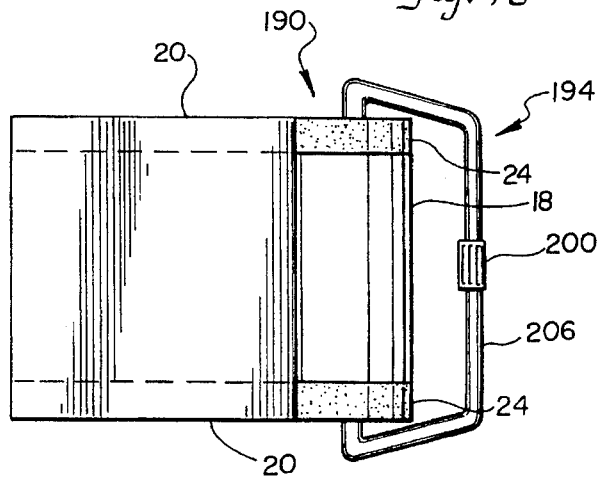
FIG. 19 is a side view of the barrier laminate and carrier of FIG. 17 as it would appear while applying the barrier laminate to a horizontal joint in a building structure.

In a second embodiment, carrier 212, shown in FIGS. 18 and 21, preferably has a pair of trailing arms 214 secured to frame 206 by welds 216 or other conventional attachment. Each of trailing arms 214 carries a roller 218 positioned to apply force to the pressure sensitive adhesive layers 24 as the barrier laminate 10 is applied to a building structure, as may be seen most clearly in FIGS. 18 and 21. As will be apparent, applying pressure to handle 200 generally normal to the surface to which the barrier laminate is applied will cause rollers 218 to apply pressure to the pressure sensitive adhesive layers 24 securing the barrier laminate 10 to the building structure. In using carrier 212 (in contrast to carrier 194) with the roll 190 as shown in FIG. 21, it may be found to be desirable to hold roll 190 away from the building and to apply pressure to the trailing rollers 218 by applying torsional pressure against trailing arms 214, to apply the barrier laminate 10 without scuffing roll 190 against the building.

Figure 25:
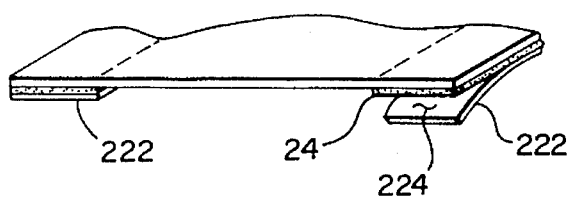
FIG. 25 is a fragmentary perspective view of the barrier laminate of FIG. 24 except including a separate release tape.

It is to be understood that a release layer 220 is preferably located on or between successive layers of the barrier layer 18 in the roll 190 to prevent permanent adhesion of the adhesive layer 24 to an adjacent layer of barrier layer 18 in the roll 190. The release layer 220 may be in the form of a coating as indicated by the cross-hatching in FIG. 24, or, alternatively, the release layer 220 may be a separate layer of tape 222 having a release coating 224 thereon facing the exposed layer 24 of pressure sensitive adhesive as shown in FIG. 25.

The barrier laminate 10 of the present invention is intended to be applied against a structure such as a house prior to the attachment of siding thereto to cover joints between the structural members defining the outer surface of the structure. As illustrated most clearly in FIGS. 17–22, the barrier laminate 10 in the form of roll 190 is adapted to be adhered on the outer surface of the structural members with the pressure sensitive adhesive portions on opposite sides of the joint therebetween with the barrier layer 18 extending longitudinally along and bridging widthwise across the joint. The roll 190 of barrier laminate 10 may be unrolled or dragged along the structure with or without a carrier such that the lengths of pressure sensitive adhesive are adhered to the structure. The adhesive portions or layers 24 may be adhered to the structure by hand pressure or by the trailing rollers 218, or by other suitable means.

Although FIGS. 17–25 are illustrated with adhesive layers on the barrier layer 18 directly, it is to be understood that each of these embodiments may have either one or two pairs of lengths of tape to provide the adhesive layers 24, as shown in FIGS. 8–10. It is to be further understood that the method of applying the barrier laminate 10 is equally applicable to the various embodiments of the laminate 10 shown in the figures.

Referring again most particularly to FIGS. 17, 18 and 19, the method of applying a barrier laminate to a building structure includes the steps of exposing a trailing portion of the roll 190 of barrier laminate 10 which has a flexible elongated barrier layer 18 with minute passageways passing through a central region thereof where the minute passageways are sized to permit passage of water vapor while at the same time preventing the passage of liquid water through the flexible elongated barrier 18. The barrier laminate 10 also has a pair of pressure sensitive adhesive layers 24, with one of each of the pair of layers located on opposite peripheral edges 20 of the flexible elongated barrier layer 18 with the pressure sensitive secured to the flexible elongated barrier layer 18 prior to the barrier laminate 10 being formed into the roll 190. The method further includes adhering the trailing portion of the barrier laminate 10 to a building structure by urging the adhesive layers 24 against the building structure, thus permitting escape of water vapor from within the building structure while simultaneously preventing the passage of liquid water from the exterior of the barrier layer into the building structure. In this method the roll 190 may be supported on the portable carrier which has frame 206 connecting hubs 196, 198 to engage the core 192 of the roll 190. The carrier 194 permits rotation of the roll 190 with respect to the carrier 194 as the trailing portion is exposed and adhered to the building structure. In the alternative embodiment shown in FIG. 18, the carrier also includes a pair of trailing rollers 218 carried by the frame 206. Each of the rollers 218 is aligned with one of the pair of adhesive layers 24 to apply pressure against the trailing portion to aid in adhering the barrier laminate 10 to the building structure.

The present invention has now been described with reference to several embodiments thereof. It will be apparent to those skilled in the art that many changes can be made in the embodiments described without departing from the scope of the present invention. Thus the scope of the present invention should not be limited to the structures methods described in this application, but only by structures and methods described by the language of the claims and the equivalents of those structures and methods.

What is claimed is:

1. A barrier laminate for attachment to the outer surface of a structure such as a house, prior to attachment of its siding, to cover joints between structural members assembled to form the structure, said barrier laminate comprising:

a flexible elongate barrier layer having opposite edges and opposite first and second major surfaces said barrier layer having minute passageways between said major surfaces affording passage of water vapor between said major surfaces while restricting the passage of liquid water and air between said major surfaces; and two lengths of tapes, with one length secured along each of the opposite edges of the barrier layer and each of said lengths of tape including a backing and a layer of pressure sensitive adhesive coated on one major surface of the backing, each of said lengths of tape having a first portion of said layer of pressure sensitive adhesive adhered on the first surface of said barrier layer adjacent one of said opposite edges and having a second portion of said layer of pressure sensitive adhesive projecting past the respective opposite edges of the barrier layer to expose said layer of pressure sensitive adhesive for adhering the barrier layer to structural members on opposite sides of a joint therebetween such that exterior liquid water and air are each restricted from entering the structure while water vapor is permitted to pass through the barrier layer intermediate the opposite edges, thus permitting any moisture trapped interior of the barrier laminate to escape as water vapor.

2. The barrier laminate according to claim 1 wherein the two lengths of tape comprise a first pair of lengths of tape and the barrier laminate further comprises a second pair of lengths of tape, and each tape of said first and second pairs of lengths of tape includes a backing and a layer of pressure sensitive adhesive coated on one major surface of the backing, with portions of the layers of pressure sensitive adhesive on each of the first and second pairs of lengths of tape being adhered to each other and portions of the layer of adhesive on the second pair of lengths of tape being adhered to the barrier laminate, with portions of the layers of pressure sensitive adhesive on the first pair of lengths of tape being exposed to provide said layers of pressure sensitive adhesive along each of the opposite edges of the barrier layer.

3. A method for providing a barrier against the infiltration of air and moisture into a structure such as a house prior to attachment of siding thereto, to cover joints between the structural members defining an outer surface of the structure, said method comprising:

providing a barrier laminate comprising a flexible elongate barrier layer having opposite edges, opposite first and second major surfaces, and minute passageways between said major surfaces affording passage of water vapor between said major surfaces while restricting the passage of liquid water and air between said major surfaces;

providing an exposed layer of pressure sensitive adhesive along each of said opposite edges by securing a length of attachment tape along each of said opposite edges, said attachment tape having a backing and a layer of pressure sensitive adhesive coated on one major surface of the backing with a first portion of the layer of pressure sensitive adhesive of the attachment tape adhered to the first surface of the barrier layer adjacent the opposite edges and a second portion of the layer of pressure sensitive adhesive of the attachment tape projecting past the opposite edges of the barrier layer to expose the second portion of the layer of pressure sensitive adhesive along each of the opposite edges of the backing such that the exposed second portion of the layer of pressure sensitive adhesive along each of the opposite edges of the barrier layer is adapted to be adhered on the outer surface of structural members on opposite sides of the joint therebetween with the barrier layer extending longitudinally along and bridging widthwise across the joint to restrict exterior liquid water and air from entering the structure while water vapor is permitted to pass through the barrier layer intermediate the first portions of the layers of pressure sensitive adhesive along the opposite edges, and thus is adapted to permit any moisture trapped interior of the barrier laminate to escape as water vapor once the barrier laminate is attached to the structure.

4. The method of claim 3 further comprising the step of adhering the second portion of the layer of pressure sensitive adhesive of the lengths of tape on the barrier laminate to the structure.

5. The method of claim 4 further comprising the step of providing a portable laminating device for performing the step of adhering portions of the layers of pressure sensitive adhesive of the lengths of tape on the first surface of the barrier layer adjacent the opposite edges with portions of the layers of pressure sensitive adhesive on the tapes projecting past the opposite edges of the barrier layer to the exposed layer of pressure sensitive adhesive along each of the opposite edges of the barrier layer, and the portable laminating device is used to perform the step of adhering portions of the layers of pressure sensitive adhesive included in the lengths of tape on the first surface of the barrier layer adjacent the opposite edges with portions of the layers of pressure sensitive adhesive included in the tapes projecting past the opposite edges of the backing to provide the exposed layer of pressure sensitive adhesive along each of the opposite edges of the barrier layer just prior to said step of adhering the exposed layer of pressure sensitive adhesive along each of the opposite edges of the barrier layer on the outer surface of the structure with the barrier layer extending longitudinally along and bridging widthwise across the joint.

6. The method of claim 4 wherein the barrier laminate and lengths of tape are formed in a roll on a core and wherein the method further comprises the step of providing a portable carrier for the roll wherein the carrier includes a pair of hubs, with one hub at each of a first and a second end of the core, and the carrier still further includes a handle exterior of the roll when the hubs are engaged with the core, and the method includes positioning the roll against the structure by grasping the carrier and dragging the roll along the structure such that the lengths of pressure sensitive adhesive adhere to the structure.

7. The method of claim 6 wherein the carrier further comprises a frame connecting the hubs with the handle and a pair of rollers carried by the frame and aligned with the exposed layers of pressure sensitive adhesive such that the rollers apply pressure to the backing of the pressure sensitive adhesive when the roll is dragged along the structure.

8. The method of claim 6 wherein the roll is formed with the adhesive facing radially inward.

9. The method of claim 6 wherein the roll is formed with the adhesive facing radially outward.

10. The method of claim 6 wherein a release layer is located between successive layers in the roll to prevent permanent adhesion of the adhesive to an adjacent layer in the roll.

11. The method of claim 10 wherein the release layer is a coating on the second major surface of the barrier layer.

12. The method of claim 10 wherein the release layer is a separate layer of tape having a release coating thereon facing the exposed layer of pressure sensitive adhesive.

13. A method of applying a barrier laminate to a building structure comprising the steps of:

a. exposing a trailing portion by unrolling a roll of barrier laminate of the type having
      i. a flexible elongate barrier layer with minute passageways passing through a central region thereof sized to permit passage of water vapor and prevent the passage of liquid water therethrough, and
      ii. a pair of pressure sensitive adhesive layers located on opposite peripheral edges of the flexible elongate barrier layer wherein the pressure sensitive adhesive layers are secured to the flexible elongate barrier layer prior to the barrier laminate being formed into the roll;

b. adhering the trailing portion of the barrier laminate to a building structure by urging the adhesive layers against the building structure to permit the escape of water vapor from within the building structure through the central region of the barrier layer while simultaneously preventing the passage of liquid water from exterior of the barrier layer into the building structure through the barrier laminate.

14. The method of claim 13 wherein the roll further comprises a core on which the barrier laminate is wound and the method further comprises supporting the roll of the barrier laminate on a portable carrier having a frame connecting a pair of hubs engaging the core for permitting rotation of the roll with respect to the carrier as the trailing portion is exposed and adhered to the building structure.

15. The method of claim 14 wherein the carrier further comprises a pair of trailing rollers carried by the frame and aligned with the pair of adhesive layers to apply pressure against the trailing portion for adhering the barrier laminate to the building structure.

* * * * *